FREQUENCY DIVIDING SYSTEM INCLUDING TRANSISTOR OSCILLATOR ENERGIZED BY PULSES DERIVED FROM WAVE TO BE DIVIDED
Filed Oct. 24, 1965 2 Sheets-Sheet 1

INVENTOR
HAROLD D. BRYANT
BY Mueller Aichele and Rauner
ATTORNEYS

Nov. 11, 1969 H. D. BRYANT 3,478,225

FREQUENCY DIVIDING SYSTEM INCLUDING TRANSISTOR OSCILLATOR ENERGIZED BY PULSES DERIVED FROM WAVE TO BE DIVIDED

Filed Oct. 24, 1965 2 Sheets-Sheet 2

INVENTOR
HAROLD D. BRYANT
BY Mueller Aichele and Rauner
ATTORNEYS

United States Patent Office 3,478,225

Patented Nov. 11, 1969

3,478,225

FREQUENCY DIVIDING SYSTEM INCLUDING TRANSISTOR OSCILLATOR ENERGIZED BY PULSES DERIVED FROM WAVE TO BE DIVIDED

Harold D. Bryant, Glendale Heights, Ill., assignor to Motorola, Inc., Franklin Park, Ill., a corporation of Illinois Filed Oct. 24, 1965, Ser. No. 504,347

Int. Cl. H03k 23/08, 23/22, 23/36

U.S. Cl. 307—220 7 Claims

ABSTRACT OF THE DISCLOSURE

Frequency dividing system including transistor oscillator with frequency determining circuit for providing the desired quotient frequency. The transistor oscillator is selectively energized through a transistor switch which connects on half cycles of one polarity of the signal to be divided. The oscillator includes a feedback circuit operative to complete a cycle, with each cycle being synchronized with the incoming signal. Failure of the incoming signal will terminate the output of the divider.

The present invention relates generally to frequency dividers and more particularly to a simplified frequency divider circuit having only two transistor stages and which will provide positive division up to ten or more with a minimum of adjustment.

A number of prior art frequency division systems include a frequency multiplier stage or stages for initially increasing the frequency of the incoming signal and some type of mixing arrangement whereby the multiplied signal is fed back and mixed with the incoming signal. The frequency divided signal is taken from the output of the mixer using a circuit similar to that used in standard radio receivers which is generally quite complex. These systems usually require two or more multiplier stages as well as some means for maintaining a constant phase relationship between the multiplied signal and the incoming signal.

Other types of frequency division systems employ a number of cascaded transistor stages which are connected in a counter type of arrangement to effectively divide the frequency of the incoming signal in proportion to the number of stages used. However, this type of an arrangement is disadvantageous in that each stage will normally only increase the division by a factor of two, so that the total number of stages must be increased or decreased as the quotient output of the divider is decreased or increased respectively. In addition, the large number of stages which may be required in both of the above identified prior art divider systems tends to render these systems bulky and costly as well as relatively complex in operation.

An object of the present invention is to provide an improved frequency dividing system having a minimum number of transistor stages and associated electronic components.

Another object of the invention is to provide a simple frequency divider circuit in which the effective divisor may be easily varied without the addition or removal of any components from the circuit.

A feature of the present invention is the provision of an oscillator having a predetermined frequency operation equal to the frequency divided output signal and a switching circuit for connecting the oscillator to a source of energizing voltage in response to an incoming signal to be frequency divided.

The invention to be described is illustrated in the drawings wherein.

Briefly described, the invention comprises in combination an oscillator circuit having a preselected oscillation frequency equal to a desired quotient of the incoming signal to be divided and a driving stage for receiving incoming signals and coupled to the input of the oscillator circuit for providing the driving power therefor. When there is a proper phase relationship between the incoming signal and the output signal of the oscillator circuit, the oscillator signal will lock in phase with the input signal at a frequency determined by the reactance in the oscillator feedback circuit and the frequency and amplitude of the input signal. However, with an improper phase relationship between the incoming and oscillator circuit signals, the oscillator circuit will function as though the driver stage were disconnected from the oscillator circuit input entirely, assuming proper biasing conditions for the oscillator are present. The output or quotient frequency of the oscillator can be made much lower than the incoming signal frequency by adjusting the reactance in the oscillator tank or feedback circuit.

Figure 1:
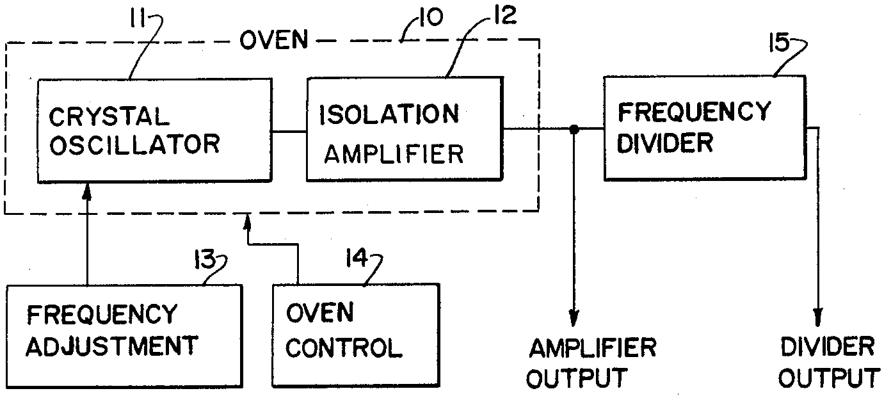
FIG. 1 is a block diagram of a frequency standard in which the novel frequency divider of this invention is used.

Referring now in detail to the drawings, there is shown in FIG. 1 a frequency standard system in which the frequency divider of the present invention is used and in which precise frequency division is extremely important. A temperature controlled crystal oscillator 11 is used for providing a highly stable frequency standard output and is mounted in oven 10 for controlling the temperature of the crystal in oscillator 11. The oscillator 11 has a frequency adjustment 13 connected thereto, and the oven 10 has a temperature control feature 14 for changing or keeping constant the oven temperature. An isolation amplifier 12 connects the oscillator signal to the frequency divider 15, and this particular circuit arrangement gives the system two outputs, each having a different frequency. The frequency divider 15 in FIG. 1 represents any one of the frequency dividers illustrated in FIGS. 2, 4, 5 and 6.

Figure 2:
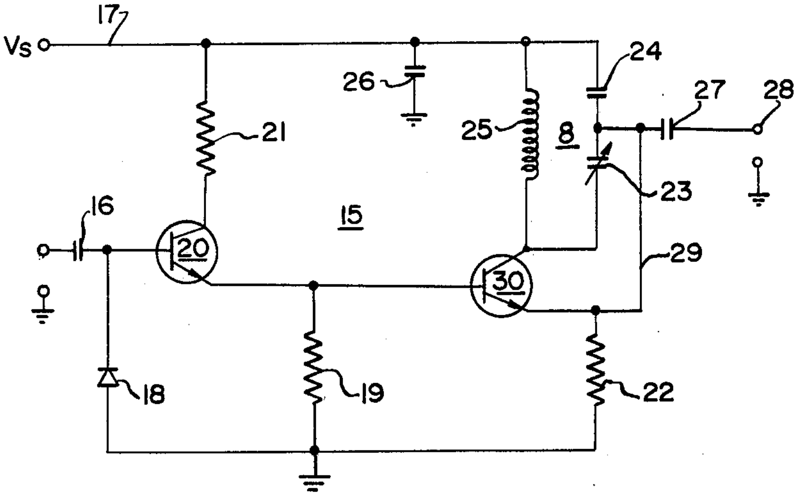
FIG. 2 is one embodiment of a divider circuit according to the present invention which includes a Colpitts oscillator connection in the output circuit thereof.

The circuit of FIG. 2 includes a Colpitts type transistor oscillator with a parallel connected inductance-capacitance tank circuit 8 in the collector of NPN transistor 30 and an input driver transistor stage 20 connected to the control or base electrode of transistor 30. Driver transistor 20 is also connected NPN and a diode 18 is connected between the control or base electrode of transistor 20 and ground insuring that only positive pulses are transmitted to the base of transistor 30. Both transistors 20 and 30 are normally non-conducting in the absence of input signals at terminal 9.

When a signal to be divided is coupled through isolation capacitor 16 to the base of transistor 20, transistor 20 turns on and connects the base of transistor 30 to the voltage supply $V_s$. The supply voltage $V_s$ is divided down by resistors 21 and 19, and the voltage appearing at the base of transistor 30 is sufficient to turn on this transistor. At this point, current immediately starts flowing in the inductance-capacitance tank 8 of the oscillator circuit which includes inductance 25 and capacitors 23 and 24.

When transistor 20 becomes cut off with the termination of an input pulse at the base of transistor 20, there is no instantaneous reversal of current flowing in the oscillator circuit of transistor 30 due to the nature of the reactance elements in tank circuit 8. Since there is no instantaneous cut off of transistor 30 and since the frequency of the incoming signal is much higher than that of the oscillator circuit, the oscillator circuit never has an opportunity to revert to its off condition during the initial phase of the oscillation cycle. The oscillator transistor 30 is actually over-driven by the incoming signal at the base of transistor 20.

Once current begins to flow in the tank circuit 8 of the oscillator, it will continue to increase in magnitude until the transistor 30 becomes saturated. During this time, the voltage fed back to the emitter of transistor 30 via feedback connection 29 and to the base of transistor 30 across resistor 19 tends to increase the forward bias at the emitter-base junction of transistor 30, providing regenerative action for the oscillator circuit. When the transistor 30 becomes saturated and the current flowing in the LC tank circuit 8 is no longer changing, degeneration in the oscillator circuit obtains and transistor 30 is driven toward cutoff.

Once degenerative action sets in and the output voltage is driven toward its minimum value (see FIG. 3), the input pulses are ineffectual to turn on transistor 30, and transistor 30 will remain cutoff until the end of the oscillation cycle, at which time the incoming pulses will again drive the oscillator transistor 30 into saturation. The capacitor 26 provides an AC path from inductance 25 to the base of transistor 30, and capacitor 27 couples the output of the LC tank 8 to the output terminal 28.

In the embodiment of FIG. 2, the capacitor 24 is much larger than capacitor 23 and the value of capacitor 23 may be varied to vary the tuning of LC tank circuit 8 and the oscillator circuit output frequency. The voltage across capacitor 23 which is fed back to the emitter of transistor 30 need only be large enough to make the oscillator loop gain equal to or greater than one.

Figure 3:
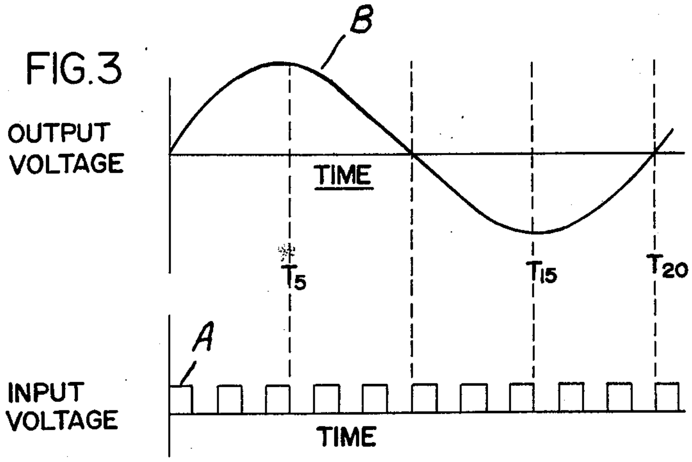
FIG. 3 illustrates graphically the division process which may be accomplished using the circuits in FIGS. 2, 4, 5 and 6.

The graph illustrated in FIG. 3 shows the relationship between the input pulses applied to the oscillator and the output signal at terminal 28. Using the circuit shown in FIG. 2 and the component values in the related table below, a 100 kilocycle signal was obtained in the oscillator output upon the application of a 1 megacycle input signal, thus providing a divide by 10 circuit. The incoming pulses at the base of transistor 30 are illustrated at A in the graph of FIG. 3 and the output oscillator signal produced thereby is illustrated at B. During the time between 0 and T5, the positive pulses A are driving the oscillator toward maximum conduction, and at time T5 the transistor 30 becomes saturated. At time T5 there is a current reversal in LC tank 8 and from T5 to time T15 there is degeneration in the oscillator circuit. At time T15 the collector current of transistor 30 once again reverses its direction and one oscillation cycle is complete after 10 input pulses or time T20. At time T20 the leading edge of the 11th pulse is applied to the base of oscillator 30, once again driving the oscillator into conduction in the manner described above.

The phase relationship between waveforms A and B should be substantially as shown in FIG. 3 in order that the oscillator conduction is smooth and continuous cycle after cycle. If there is a significant phase difference between the incoming signal A and the oscillator signal B, there will be noticeable distortion in the output or even a complete failure of the system to divide at all. When the phase difference between signals A and B is large enough so that the pulses A do not drive the oscillator circuit into conduction at the end of each oscillation cycle as shown in FIG. 3, the oscillator will oscillate at its natural resonant frequency as if the driver stage 20 were disconnected from the input of the oscillator circuit. The graph in FIG. 3 represents the ideal case of perfect phase lock, and in this situation the leading edge of the 11th pulse appears exactly at time T20.

It is possible, however, to obtain division using the circuit in FIG. 2 when the input signal A is not a multiple of the oscillator frequency, but not with any degree of predictability.

The following values are given for the circuit of FIG. 2, but are listed for purposes of illustration only and should not be construed as limiting the scope of this invention in any manner.

Table I

| | |
|---|---|
| Capacitor **16** | 1,000 micromicrofarads. |
| Supply voltage $V_s$ | 23 volts DC. |
| Diode **18** | Motorola SG5028. |
| Resistor **19** | 10 kilohms. |
| Transistor **20** | NPN, Motorola M9036. |
| Resistor **21** | 22 kilohms. |
| Resistor **22** | 1 kilohm. |
| Capacitor **23** | 3,000 micromicrofarads. |
| Capacitor **24** | .047 microfarad. |
| Inductor **25** | 1 millihenry. |
| Capacitor **26** | 4.7 microfarads. |
| Transistor **30** | NPN, Motorola M9036. |

The embodiments of FIGS. 4, 5 and 6 all have the same general principle of operation as that described with reference to FIG. 2. Each of these embodiments includes a driver transistor and an oscillator which is driven at a frequency equal to the quotient of the signal frequency to be divided.

Figure 4:
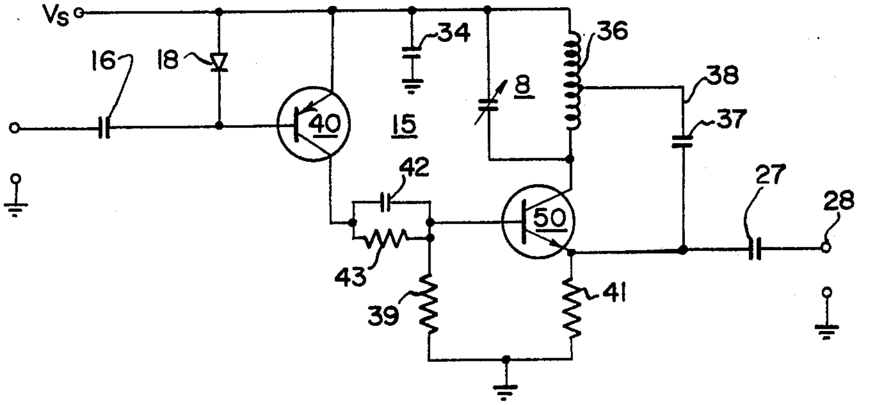
FIG. 4 is another embodiment for the invention using a Hartley oscillator connection in the output circuit thereof.

In FIG. 4 the input signals are applied to the driver transistor 40 and coupled from the collector of transistor 40 through parallel resistance-capacitance network 42–43 to the base of the transistor 50. The oscillator circuit of FIG. 4 includes a Hartley type connection with the feedback path 38 connected to a tap on inductance 36 in LC tank 8 for coupling a feedback voltage via capacitor 37 to the emitter of transistor 50. The driver transistor 40 passes only positive pulses due to the clipping action of diode 18, and these pulses being in phase with the oscillator output drives the transistor 50 in a manner similar to the operation of the Colpitts type oscillator connection in the circuit of FIG. 2. Resistor 39 should be selected to maintain transistor 50 cutoff in the absence of input signals applied to the base of transistor 40, and feedback capacitor 34 should be large enough to provide a good AC ground at the LC tank circuit 8. The circuit of FIG. 4 differs from the circuit of FIG. 2 in that the oscillator feedback connection is made at inductance 36 in the LC tank 8 rather than at the tank circuit capacitance and a PNP 40 rather than NPN transistor is used as an input switch.

Figures 5, 6:
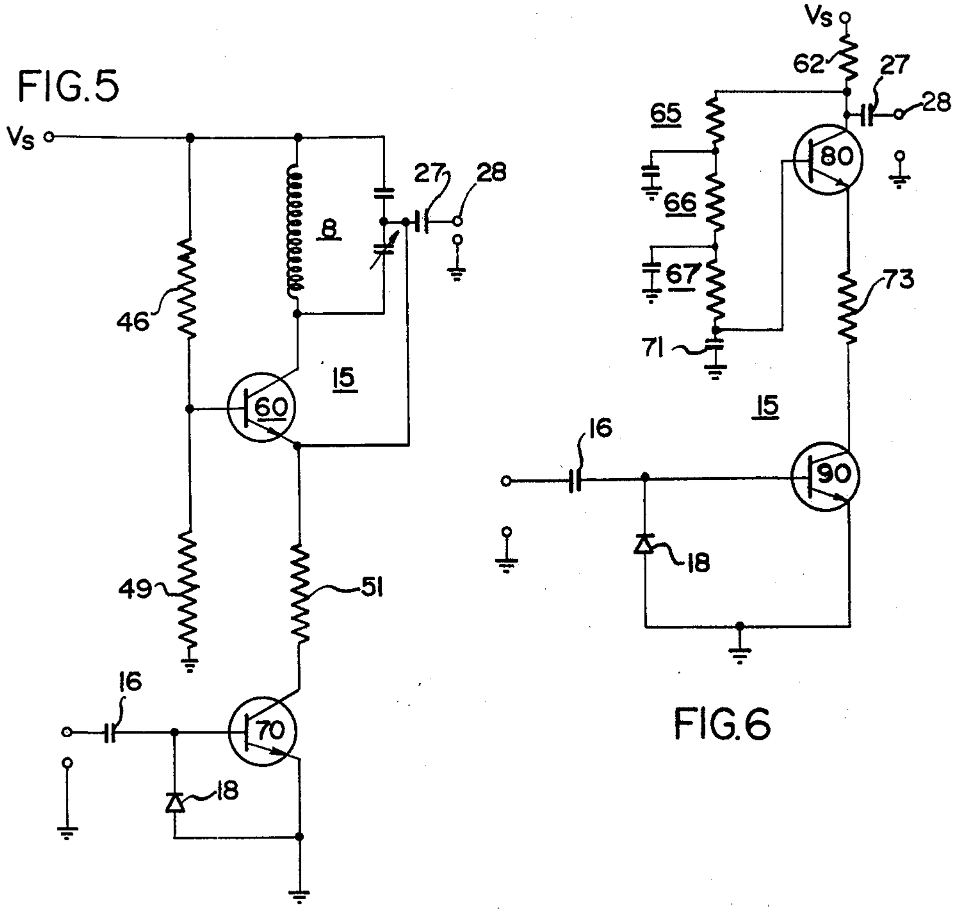
FIG. 5 is another embodiment of the invention with a different type of driving arrangement than that shown in FIGS. 2 and 4.
FIG. 6 is another embodiment of the invention using a phase shift oscillator connection in the output circuit thereof.

The circuit of FIG. 5 is similar to the circuit of FIG. 2 in that the Colpitts type oscillator connection is used. However, the driver transistor 70 in FIG. 5 is connected in the emitter circuit of oscillator transistor 60 and provides the driver power for the oscillator by injection from the collector of transistor 70 via resistor 51. When the circuit path between the emitter of transistor 60 and ground is closed through driver transistor 70, the emitter base junction of transistor 60 becomes forward biased and transistor 60 is driven into conduction. Resistors 46 and 49 are connected as a voltage divider between voltage supply $V_s$ and ground and maintains transistor 60 cutoff when transistor 70 is non-conducting.

The driver and oscillator transistors 80 and 90 in the circuit of FIG. 6 are connected via resistor 73 in a cascade connection similar to that shown in FIG. 5, and the feedback circuit of the oscillator includes three resistance-capacitance L sections 65, 66 and 67 to provide the 180° phase shift in the collector-to-base transistor feedback path. Each of the RC sections provides a 60° phase shift in the signal fed back to the base of transistor 80. A bias resistor 62 is connected between the supply voltage $V_s$ and the collector of transistor 80, and the oscillator output signal is coupled through capacitor 27 to output terminal 28.

It is apparent from the foregoing disclosure that the present invention represents a substantial advancement in the art of frequency division. The above circuits require a minimum of electric components and the output quotient of the frequency divided signal may be easily varied.

I claim:

1. A frequency divider including in combination:
(a) oscillator means having circuit means providing a preselected frequency of operation, said oscillator means being biased to cutoff in the absence of an energizing voltage,
(b) circuit means for connecting said oscillator means to energizing voltage supply means,
(c) switch means including a semiconductor device having first and second electrodes connected to said circuit means for completing a circuit for applying energizing voltage to said oscillator means and a control electrode for controlling the conductivity between said first and second electrodes, and rectifier means connected between said control electrode and a reference potential for bypassing portions of one polarity of an applied alternating current signal and causing the opposite polarity portions of such signal to bias said control electrode to provide a conducting path between said first and second electrodes of said semiconductor device,
(d) and means connected to said control electrode for applying an alternating current signal to be divided thereto,
(e) said switch means being rendered conductive by the pulses formed by the portions of the applied alternating current signal of said opposite polarity to cause said circuit means to apply the energizing voltage to said oscillator means to cause operation thereof at the preselected frequency.

2. The circuit of claim 1 wherein said oscillator means includes:
(a) a transistor having input, output and control electrodes, with said input and output electrodes being connected to said circuit means, and
(b) a plurality of resistance-capacitance L sections connected in cascade between said output electrode and said control electrode for providing 180° phase shift in said oscillator means.

3. The circuit of claim 1 wherein said oscillator means includes:
(a) a transistor having input, output and control electrodes, with said control electrode being connected to said circuit means,
(b) and inductance-capacitance tank circuit connected to said output electrode of said transistor and tuned to oscillate at said preselected frequency of operation, and
(c) means connecting said inductance-capacitance tank circuit to said input electrode of said transistor for providing a feedback path in said oscillator means to sustain oscillations therein.

4. The circuit according to claim 3 wherein:
(a) said inductance-capacitance tank circuit includes an inductor and a pair of series connected capacitors connected in parallel with said inductor to the output electrode of said transistor, and
(b) said feedback path extends to said input electrode of said transistor and from the junction of said series connected capacitors.

5. The circuit according to claim 3 wherein:
(a) said inductance-capacitance tank circuit includes an inductor and a capacitor connected in parallel and connected to the output electrode of said transistor, and
(b) said feedback path extends from said inductor to the input electrode of said transistor.

6. The circuit according to claim 1 wherein:
(a) said semiconductor device of said switch means is a transistor having emitter, base and collector electrodes, with said emitter and collector electrodes forming said first and second electrodes and said base electrode forming said control electrode, and
(b) said rectifier means is a diode connected between said base electrode and ground potential for passing negative pulses and blocking positive pulses.

7. The circuit according to claim 1 wherein:
(a) said oscillator means includes a transistor having emitter, base and collector electrodes, and circuit means connected thereto forming an oscillator circuit,
(b) said switch means includes a driver transistor having emitter, base and collector electrodes, and a diode connected between said base electrode of said driver transistor and the reference potential for bypassing negative pulses, and wherein
(c) said means applying an alternating current signal is connected to said base electrode of said driver transistor and said emitter and collector electrodes thereof complete the conducting path of said switch means for energizing said oscillator means.

References Cited

UNITED STATES PATENTS

| | | | |
|---|---|---|---|
| 2,452,811 | 11/1948 | Usselman | 331—51 |
| 3,229,227 | 1/1966 | Popodi | 331—117 |
| 3,305,730 | 2/1967 | Parzen | 328—25 XR |
| 2,413,956 | 1/1947 | Coykendall | 331—51 |
| 3,217,270 | 11/1965 | Friedrichs et al. | 331—173 |
| 3,230,399 | 1/1966 | Hykes | 307—88.5 |
| 3,303,358 | 2/1967 | Krausz | 307—88.5 |

OTHER REFERENCES

"A Frequency Divider Circuit," by Bach, in RCA technical notes, RCA TN No. 1.

Pub. I, "Modified Locked-Oscillator Frequency Dividers," by Sulzer, in Proceedings of The IRE, vol. 39, No. 12, pp. 1535–1537, dated December 1951.

DONALD D. FORRER, Primary Examiner

S. D. MILLER, Assistant Examiner

U.S. Cl. X.R.

307—225, 295; 328—30; 331—117, 173